(12) United States Patent
Trail et al.

(10) Patent No.: US 6,206,338 B1
(45) Date of Patent: Mar. 27, 2001

(54) FAIL AS-IS HYDRAULIC ACTUATOR

(75) Inventors: Len Albert Trail, Aberdeenshire (GB); Timothy J. Otteman, Houston, TX (US); Richard Blair, Glasgow (GB)

(73) Assignee: ABB Vetco Gray, Inc., Houston, TX (US)

( * ) Notice: Subject to any disclaimer, the term of this patent is extended or adjusted under 35 U.S.C. 154(b) by 0 days.

(21) Appl. No.: 09/470,409

(22) Filed: Dec. 22, 1999

(51) Int. Cl.⁷ .............. F16K 35/00; F16K 3/00
(52) U.S. Cl. .......................... 251/94; 251/327
(58) Field of Search .................. 251/115, 116, 251/327, 94

(56) References Cited

U.S. PATENT DOCUMENTS

| | | | |
|---|---|---|---|
| 3,941,141 | * 3/1976 | Robert | 251/94 |
| 4,052,995 | * 10/1977 | Ellison | 251/94 |
| 4,522,370 | * 6/1985 | Noack et al. | 251/94 |
| 5,190,106 | * 3/1993 | Johnston | 251/94 |

* cited by examiner

Primary Examiner—Kevin Shaver
Assistant Examiner—David A. Bonderer
(74) Attorney, Agent, or Firm—James E. Bradley; Bracewell & Patterson

(57) ABSTRACT

A hydraulic actuator for a valve that fails as-is in the event of control line failure. The actuator has a housing carrying an actuator piston for actuating the valve open or closed. An elongate gripper shaft extends upward from the actuator piston. A collet member is carried within the housing and adapted to engage the gripper shaft when moved upward relative to the housing. The collet member is biased upward by a spring. A release piston abutting the dog members prevents their upward movement when actuated to a lower position. The release piston is supplied with the same hydraulic fluid pressure as the actuator piston. If pressure is removed, the spring moves the collet member into locking engagement with the shaft.

13 Claims, 4 Drawing Sheets ured with this invention mounted on a valve in an open position.

FAIL AS-IS HYDRAULIC ACTUATOR

TECHNICAL FIELD

This invention relates to a hydraulic actuator for controlling the operation of a valve which is designed to actuate automatically and remain in position upon the loss of control pressure.

BACKGROUND ART

Gate and other sliding stem valves used in fluid flow control are opened and closed by inserting an obstruction or fluid control device into the flow. These valves are operated by a valve actuator employing a variety of methods, including manual actuation, diaphragm-type actuation, and hydraulic actuation. The actuator is usually mounted to the valve and provides the reciprocating linear motion required to open, close, and position the flow control device within the valve.

In the case of a hydraulic actuator, a hydraulic control feed is used to actuate the valve. A control feed line provides hydraulic pressure which actuates a piston in the actuator. As the piston moves, it opens and closes the valve. Generally, opening or closing the valve requires a high control feed pressure. When the desired degree of open or closed is reached, the control line can be locked-in to maintain the pressure. When there is a sudden drop in control feed line pressure, such as due to a failure in the feed line, the valve position is no longer locked-in. Depending on the configuration of the valve and the pressure in the flow line, the valve will tend to fail either in a fully open or a fully closed position. A pressure differential across the flow control device causes an ejection force tending to move the flow control device upward. Most prior art actuators compensate for this by forcing the flow control device either to it upper most position or down to its lower most position, thus fully opening or closing the valve. However, in some situations it is desirable for the valve to resist the ejection force and remain at the degree of open or closed it had been before the loss of control feed pressure.

It is therefore desirable to provide a hydraulic actuator that fails as-is, thus remaining in a given position in the event of a drop in control line pressure. It is also desirable that the actuator be compact and reliable and resist ejection force.

SUMMARY OF THE INVENTION

The present invention is directed toward a valve actuator that fails as-is. The valve is opened and closed by sliding a stem between two positions. The valve actuator has a housing for joining to the valve. An actuator piston is carried within the housing and adapted to couple to the valve stem. The actuator piston can reciprocate within the cylinder housing to slide the stem between the two positions. An elongate gripper shaft extends from the actuator piston. A gripping member is carried within the housing and is moveable between an engaged position, restraining movement of the gripper shaft in one direction, and a disengaged position, allowing movement of the gripper shaft in both directions. A spring member is mounted in the housing in engagement with the gripping member and urges the gripping member into the engaged position. A release piston is reciprocatingly carried in the housing for moving the gripping member to the disengaged position. A hydraulic passage extends from the actuator piston to the release piston to move the release piston to place the gripping member in the disengaged position when hydraulic fluid pressure exists at the actuator piston.

A locking ring with a tapered inner surface is carried within the upper housing. The gripping member is carried in the locking ring and the tapered inner surface that is adapted to force the gripping member inward into engagement with the gripper shaft when the spring member are moves the gripping member to the engaged position. Preferably, the gripping member comprises a collet member having collet fingers, each with a tapered outer surface adapted to engage and slid against the tapered inner surface of the locking ring. The release piston has a central protruding portion that extends into the locking ring and into abutment with the gripping member. The release piston is located on one side of the gripping member while the actuator piston is located on the opposite side. Preferably, the spring member is carried within the locking ring. The gripping shaft is grooved and the gripping member has mating grooves.

BEST MODE FOR CARRYING OUT THE INVENTION

Figure 1A:
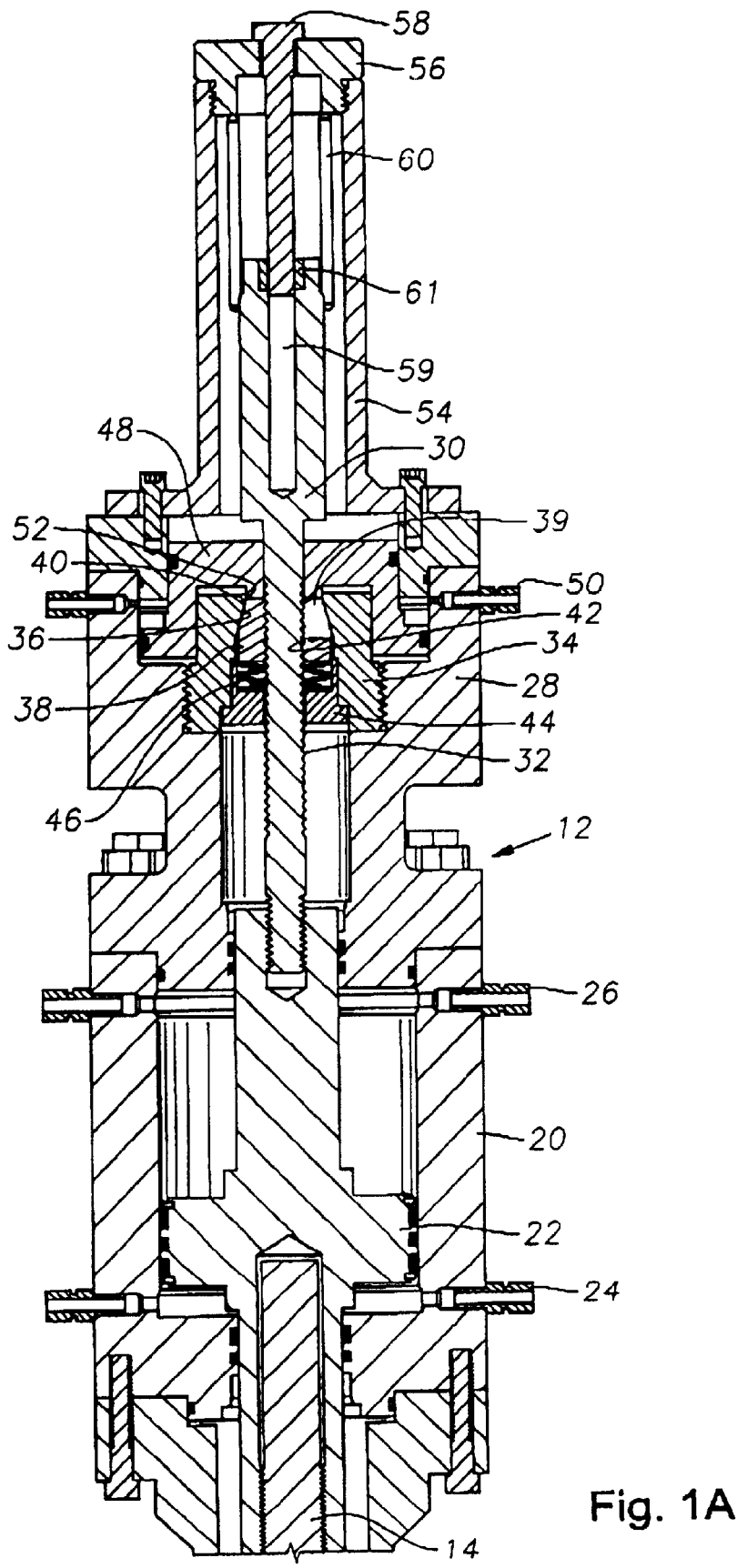
FIGS. 1A and 1B are a sectional view of a valve actuator constructed in accordance with this invention mounted on a valve in an open position.
Figure 1B:
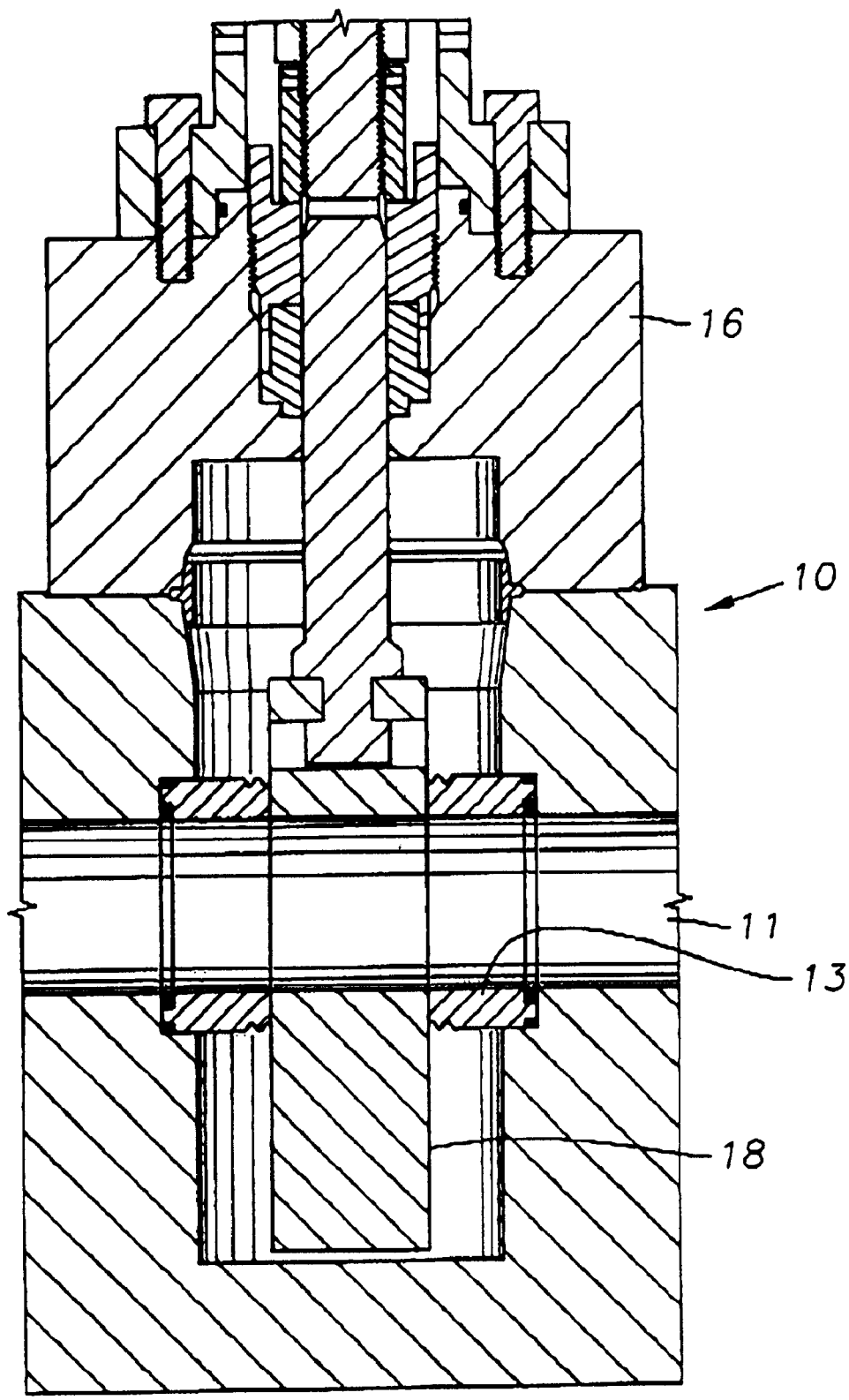
Figure 2A:
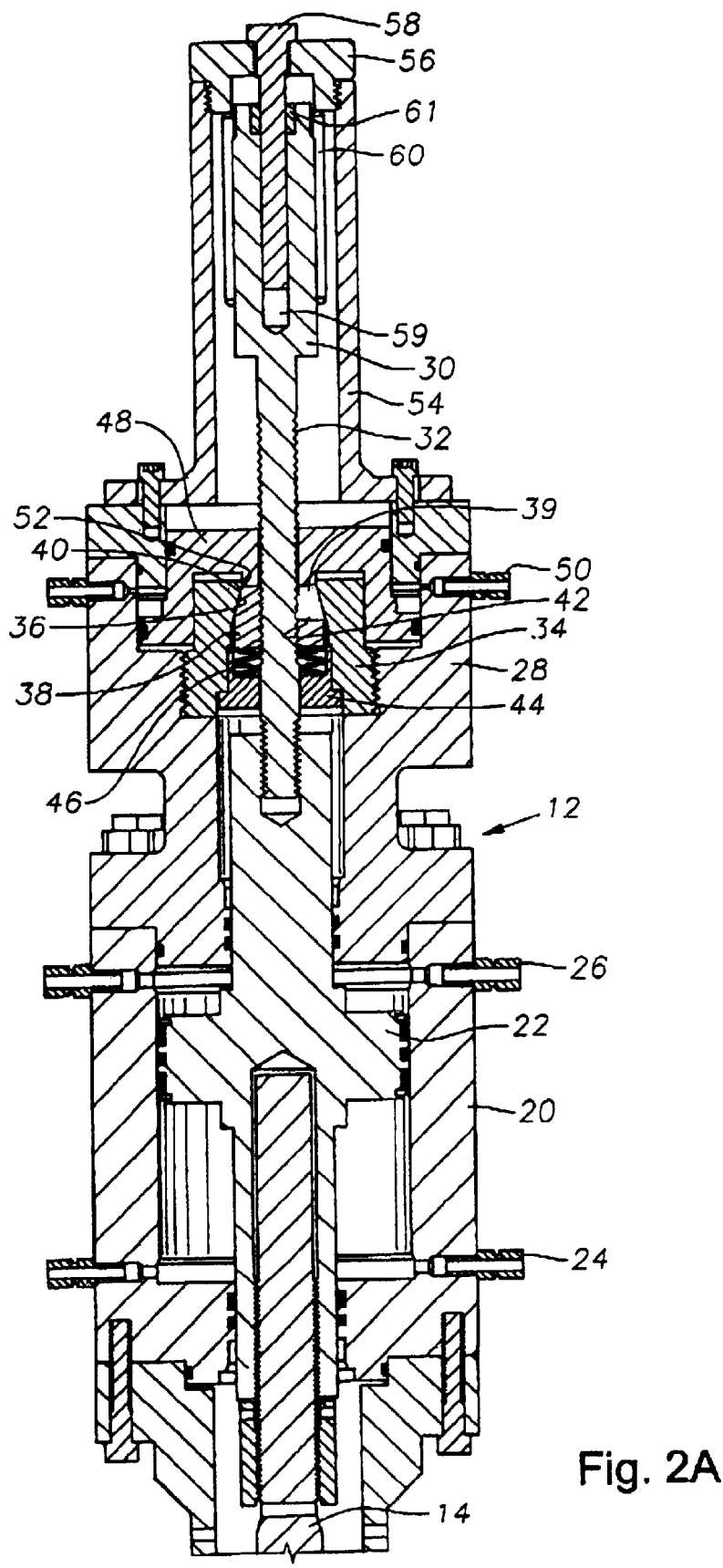
FIGS. 2A and 2B are a sectional detail of a valve actuator constructed in accordance with this invention mounted on a valve in a closed position.
Figure 2B:
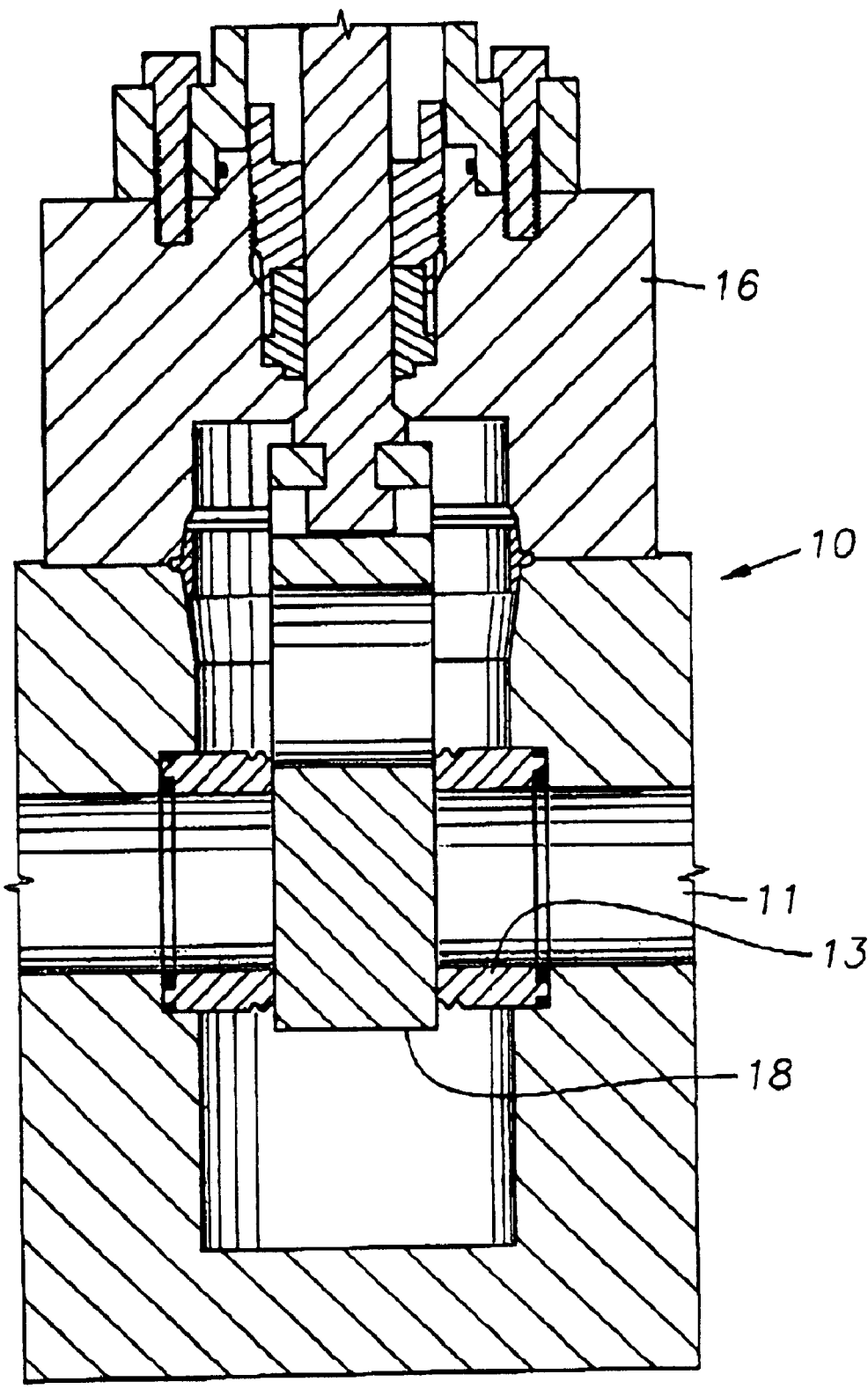

Referring to FIGS. 1A and 1B, a valve 10 for use with a fail as-is actuator 12 constructed in accordance with this invention comprises generally a sliding stem 14 extending from a valve body 16. Valve 10 has a transverse flow passage 11 intersecting a cavity. Seat rings 13 are located at the junction of flow passage 11 and the cavity. Stem 14 is adapted to reciprocate linearly and controls a gate 18. Gate 18 is generally an obstruction that is moveable into and out of the flow path to restrict fluid flow. In the case of the valve depicted in FIG. 1B, the gate 18 is a plate having a hole which can be positioned between seat rings 13 to allow fluid passage or to restrict fluid passage. In this particular valve 10, as stem 14 is moved to an upward position, gate 18 blocks flow, and as stem 14 is moved to a downward position, gate 18 allows flow; however, it is also common that valve 10 is configured to allow flow when gate 18 is moved to an upward position. FIGS. 1A and 1B depict valve 10 in an open position and FIGS. 2A and 2B depict valve 10 in a closed position.

A generally tubular cylinder housing 20 is joined to valve body 16. Cylinder housing 20 internally carries an actuator piston 22 such that piston 22 seals inside cylinder housing 20 and can reciprocate axially. Actuator piston 22 sealingly extends outward from the bottom of housing 20 to threadingly engage stem 14. Lower and upper hydraulic ports 24, 26 pass through cylinder housing 20; lower port 24 is near a lower end of housing 20 and upper port 26 is at an upper end of housing 20.

An upper housing 28 is joined to the upper end of cylinder housing 20. A portion of piston 22 extends upward through upper housing 28 and threadingly engages an elongate gripper shaft 30. The outer surface of shaft 30 has a series of ridges or gripper teeth 32. An upper end of upper housing 28 carries a locking ring 34. Locking ring 34 is generally cylindrical, but has a tapered inner surface 36 which decreases in diameter towards the upper end of ring 34. A gripping or collet member 38 is carried within locking ring 34 around gripper shaft 30. Collet member 38 is a ring which has slots defining separate fingers 39 allowing collet member 38 to radially expand and contract. Collet member 38 has a tapered outer surface 40 adapted to engage surface 36. Upward movement of collet member 38 relative to ring 34, forces collet fingers 39 inward and into engagement with gripper shaft 30. Collet member 38 has a toothed inner surface 42 adapted to mate with gripper teeth 32 of shaft 30, enabling collet member 38, when contracted inward, to grip shaft 30 and restrain upward movement.

Collet fingers 39 are captured within locking ring 34 by spring base 44 which threadingly inserts into the lower end of locking ring 34. Spring base 44 supports a series of spring washers 46 beneath collet member 38. Spring washers 46 bias collet member 38 upward into tapered surface 36, and thus inward into engagement with gripper shaft 30.

A release piston 48 is reciprocatingly carried within upper housing 28 residing above locking ring 34. Hydraulic port 50 passes through the upper end of housing 28. Piston 48 has a central protrusion 52 which extends downward inside locking ring 34 and contacts collet fingers 39. As hydraulic pressure is applied through port 50, piston 48 is actuated downward and forces collet fingers 39 downward. This forces collet fingers 39 out of taper 36. Collet fingers 39 radially expand, thus allowing toothed inner collet surface 42 to disengage from ratchet teeth 32. If hydraulic pressure is released from port 50, piston 48 is released and allowed to move upward. Spring washers 46 force collet fingers 39 upward back into taper 36, and thus inward into engagement with gripper shaft 30.

An indicator housing 54 is joined to the upper end of upper housing 28. Indicator housing 54 is elongate and tubular, sized to contain gripper shaft 30, and is capped at the upper end by end cap 56. A guide sleeve 60 joined to cap 56 and fits concentrically within override housing 54 and over gripper shaft 30 to support its upper end. A linear transducer 58 threads into cap 56 and extends downward into a corresponding cavity 59 in the upper end of gripper shaft 30. A magnet 61 is secured in the upper end of gripper shaft 30 to pass freely over transducer 58. Together, the magnet 61 and linear transducer 58 electronically indicate the valve's position.

In use, actuator 12 is installed on a valve 10. Valve stem 14 is threaded into the lower end of actuator piston 22. Valve 10 is then installed in a flow line for service and hydraulic ports 24, 26, 50, are plumbed to a control mechanism (not shown). Lower actuator piston port 24 and release piston port 50 are plumbed to feed from the same pressure source, so that when pressure is applied through port 24, pressure is also applied through port 50. When pressure is reduced through port 24, pressure is also reduced through port 50.

Gate 18 is pressure balanced relative to pressure in passage 11 by hydraulic pressure applied through port 26. If a hydraulic failure occurs the pressure in passage 11 forces gate 18 upward. Valve 10 can be actuated open, closed, or part way between by applying pressure differential between ports 24 and 26. When pressure is applied through port 24, actuator piston 22 is actuated upward to close gate 18. Pressure is also simultaneously applied through port 50, forcing release piston 48 and collet member 38 downward. In this downward position, collet fingers 39 spring out of taper 36 and thus do not engage gripper shaft 30. If hydraulic pressure is lost at port 24 while gate 18 is partially open, it would be imbalanced relative to pressure in flow passage 11. Pressure is also lost at port 50. This releases piston 48, which no longer holds collet fingers 39 out of taper 36. Spring washers 46 will bias collet fingers 39 upward into taper 36 and into engagement with gripper shaft 30. With collet fingers 39 in engagement with gripper shaft 30, collet fingers 39 bear against locking ring 34 and prevent actuator piston 22 from moving further upward. Thus the actuator 12 resists ejection force and fails as-is.

When pressure is applied through port 26, actuator piston 22 is actuated downward to move control member to the open position. Pressure is released through port 50 and release piston 48 is not actuated downward, thus collet fingers 39 are biased upward into engagement with gripper shaft 30. Shaft 30 ratchets downward through collet fingers 39, as collet member 38 is pulled out of taper 36 and expands to release shaft 30 then spring washers 46 bias collet member 38 back into taper 36. As shaft 30 ratchets downward, downward movement of actuator piston 22 is not restrained.

The valve actuator of this invention has several advantages. It is compact and requires approximately the same space as a conventional hydraulic valve actuator. The general shape is similar to other valve actuators, thus allowing it to be installed in place of existing actuators. Overall, the valve actuator is simple in design and the mechanism that provides the fail as-is capacity has few moving parts, thus the actuator is very reliable.

While the invention has been shown in only one of its forms, it is not thus limited but is susceptible to various changes and modifications without departing from the spirit thereof.

We claim:

1. An actuator for a valve, said valve being opened and closed by sliding a stem between a first and a second position, said actuator comprising:

a housing for joining to said valve;

an actuator piston reciprocatingly carried within said housing and adapted to couple to said stem, for sliding said stem between said first and said second positions;

an elongate gripper shaft coupled to and extending from said actuator piston;

a gripping member carried in said housing, said gripping member being moveable between an engaged position restraining movement of said gripper shaft in one direction and a disengaged position, allowing movement of said gripper shaft in both directions;

a spring member mounted in said housing in engagement with said gripping member for urging said gripping member to said engaged position;

a release piston reciprocatingly carried in said housing for moving said gripping member to said disengaged position; and a hydraulic passage extending from said actuator piston to said release piston for moving said release piston to place said gripping member in said disengaged position when hydraulic fluid pressure exists at said actuator piston.

2. The actuator of claim 1 further comprising a locking ring carried in said housing and having a tapered inner surface;

wherein said gripping member is carried in said locking ring and said tapered inner surface is adapted to force said gripping member inward into engagement with said gripper shaft when said spring member moves said gripping member to said engaged position.

3. The actuator of claim 2 wherein said gripping member comprises a collet member having collet fingers, each finger having a tapered outer surface adapted to engage and slide against said tapered inner surface.

4. The actuator of claim 2 wherein said release piston has a central protruding portion that extends into said locking ring into abutment with said gripping member.

5. The actuator of claim 2 wherein said release piston is located on one side of said gripping member and said actuator piston is located on an opposite side of said gripping member.

6. The actuator of claim 2 wherein said spring member is carried within said locking ring.

7. The actuator of claim 1 wherein said gripping shaft is grooved and said gripping member has mating grooves.

8. An actuator for a valve, said valve opened and closed by a reciprocating stem, said actuator comprising:

a housing for joining to said valve;

an actuator piston adapted to couple to said stem for reciprocating within said housing;

a collet member carried in said housing and adapted to restrain movement of said actuator piston in one direction when in an engaged position and to allow movement in both directions in a disengaged position, said collet member having collet fingers each with a tapered outer surface;

a locking ring carried in said housing having a tapered inner surface adapted to slidingly engage said tapered outer surface and force said gripping member into an engaged position;

a spring member carried in said housing adapted to bias said gripping member into said tapered inner surface and into an engaged position;

a release piston adapted to move said gripping member from said engaged position to said disengaged position when hydraulic pressure is applied to both said release piston and said actuator piston.

9. The actuator of claim 8 wherein said spring member is carried within said locking ring.

10. The actuator of claim 8 wherein said collet member has grooves which engage a grooved gripping shaft extending from said actuator piston.

11. The actuator of claim 8 wherein said release piston has a central protruding portion that extends into said locking ring into abutment with said collet member.

12. The actuator of claim 8 wherein said release piston is located on one side of said collet member and said actuator piston is located on an opposite side of said collet member.

13. A method for actuating a valve which is opened and closed by sliding a stem between a first and a second position comprising the steps of:

providing a valve actuator having an actuator piston, a gripper shaft extending from said piston, a gripping member which is biased by a spring to an engaged position engaging said gripper shaft, and a release piston which when supplied with hydraulic fluid pressure moves said gripping member to a disengaged position;

coupling said valve actuator to said valve with said actuator piston coupled to said stem;

supplying hydraulic pressure simultaneously to both of said pistons to move said gripping member to said disengaged position and causing said stem to move axially; and in the event said hydraulic pressure fails, allowing said spring to move said gripping member into engagement with said gripper shaft to stop further movement of said stem.

\* \* \* \* \*

UNITED STATES PATENT AND TRADEMARK OFFICE
CERTIFICATE OF CORRECTION

PATENT NO. : 6,206,338 B1
DATED : March 27, 2001
INVENTOR(S) : Len Albert Trail, et al.

It is certified that error appears in the above-identified patent and that said Letters Patent is hereby corrected as shown below:

<u>Title page, Item [57], Abstract,</u>
Line 8, delete "dog" and insert -- collet --.

<u>Column 2,</u>
Line 5, after "member" delete "are".
Line 9, delete "slid" and insert -- slide --.

Signed and Sealed this

Thirtieth Day of October, 2001

Attest:

NICHOLAS P. GODICI
*Attesting Officer*     *Acting Director of the United States Patent and Trademark Office*